United States Patent [19]

Takeuchi et al.

[11] Patent Number: 4,846,016
[45] Date of Patent: Jul. 11, 1989

[54] DIRECT-COUPLING/DIFFERENTIAL CHANGEOVER TRANSFER APPARATUS

[75] Inventors: Kenji Takeuchi; Koji Kiryu; Kazuyuki Tanaka, all of Aichi, Japan

[73] Assignee: Aisin Seiki Kabushiki Kaisha, Kariya, Japan

[21] Appl. No.: 80,399

[22] Filed: Jul. 29, 1987

[30] Foreign Application Priority Data

Jul. 31, 1986 [JP] Japan .................. 61-178913
Jul. 31, 1986 [JP] Japan .................. 61-178914
Aug. 14, 1986 [JP] Japan .................. 61-189609

[51] Int. Cl.$^4$ .................. B60K 17/346; F16H 1/44; F16H 37/08
[52] U.S. Cl. .................. 74/710.5; 74/473 R; 74/714; 74/781 R; 74/785; 74/789; 180/247; 180/249
[58] Field of Search .................. 74/473 R, 710.5, 714, 74/785, 789, 781 R; 180/247, 248, 249;

[56] References Cited

U.S. PATENT DOCUMENTS

| | | | |
|---|---|---|---|
| 4,074,591 | 2/1978 | Dick .................. | 74/714 X |
| 4,103,753 | 8/1978 | Holdeman .................. | 180/247 |
| 4,440,042 | 4/1984 | Holdeman .................. | 74/785 |
| 4,458,557 | 7/1984 | Hayakawa .................. | 180/247 X |
| 4,677,875 | 7/1987 | Batchelor .................. | 180/249 X |

FOREIGN PATENT DOCUMENTS

1093798 12/1967 United Kingdom .
1373953 11/1974 United Kingdom .
A2063790 6/1981 United Kingdom .

Primary Examiner—Allan D. Herrmann
Attorney, Agent, or Firm—Burns, Doane, Swecker & Mathis

[57] ABSTRACT

A direct-coupling/differential changeover apparatus is provided with a speed change gear function and includes an input member, two output members, a reaction member, a planetary gear set, and a engage/disengage changeover apparatus for effecting engagement-/disengagement between elements of the planetary gear set and the members and between two of the elements of the planetary gear set. The engage/disengage changeover apparatus establishes a direct-coupled power train between all input and output members by engaging any one of the elements of the planetary gear set with the reaction member and by engaging one of the two other elements of the planetary gear set with the input member and the remaining element of the gear set with two output members. A differential power train is established between the input member and the two output members and a differential relationship between the two output members by engaging any one of the elements of the planetary gear set with the input member and by engaging the other two elements with the two output members, independently of each other. Transfer between direct-coupling/differential modes in four wheel drive is attained, optionally with two wheel drive modes or with the neutral mode. The direct-coupling mode may have a different speed change ratio from the differential mode.

38 Claims, 6 Drawing Sheets

DIRECT-COUPLING/DIFFERENTIAL CHANGEOVER TRANSFER APPARATUS

FIELD OF THE INVENTION

The present invention relates to a transfer apparatus particularly for all-wheel drive vehicles, and more specifically to a transfer apparatus provided with direct-coupling/differential changeover gears (including a speed change gear function).

BACKGROUND

In the above-mentioned transfer gear provided with a speed change gear function which allows a driver to select a low-speed high-power position or a high-speed low-power position and a differential function which can prevent a tight-corner braking phenomenon produced in vehicle turning, at least one change gear and at least one control differential gear are required.

The above transfer apparatus provided with two functions are large in size and heavy in weight as compared with a transfer apparatus provided with either one of the speed change gear and central differential gear. Further, there exist other drawbacks such that the number of gears increases, and the changing-over mechanism is complicated.

SUMMARY OF THE DISCLOSURE

An object of the present invention is to solve the above-mentioned drawbacks and to provide a novel transfer apparatus including a direct-coupling/differential changeover mechanism for realizing both direct-coupling and differential functions by means of a train of gears in addition to speed change function.

Further objects of the present invention will become apparent in the entire disclosure.

A direct-coupling/differential changeover transfer apparatus of a first aspect of the present invention comprises an input member; two output members; a reaction member; a planetary gear set; and engage/disengage changeover means for effecting engagement/disengagement between elements of the planetary gear set and said members and between two out of said elements. The transfer apparatus of the first aspect is characterized in that the engage/disengage changeover means establishes direct-coupled power train between all the input and output members by engaging any one of the elements of the planetary gear set with the reaction member and by engaging one of the two other elements with the input member and the other (remaining one) thereof with two output members; and further said engage/disengage changeover means establishes a differential power train between the input member and the two output members in a differential relationship between the two output members by engaging any one of the elements of the planetary gear set with the input member and by engaging the other two elements with the two output members, independently of each other. Further, the transfer apparatus is characterized in that different speed change ratios can be obtained with respect to the output members between the differential power trains and the direct-coupled power train.

According to a second aspect of the present invention there is provided:

an engage/disengage changeover operation means for a transfer apparatus provided with speed change gear function, and comprising an input member; two output members; a reaction member; a planetary gear set; and engage/disengage changeover means for effecting engagement/disengagement between elements of the planetary gear set and said members and between two out of said different elements, said changeover operation means further comprising:
a pair of fork shafts each provided with a fork member and an operation lever operatively connected to the fork shafts;

movement of said operation lever being converted into movements of the fork shafts to shift the engage/disengage changeover means;

on an input side, said movement causing the input member to selectively engage with any one of the elements of the planetary gear set; and on an output side, said movement of the other of the fork shafts establishing a first changeover state (differential power train) in which each of two of said elements except said one element engaged with the input member is engaged with each one of the output members and a second changeover state (direct-coupled power train) in which another element except said element engaged with the input member is engaged with two output members and the remaining element is engaged with the reaction member.

According to a third aspect of the present invention, there is provided a transfer apparatus having an input member; two output members; a reaction member; a planetary gear set; and input-side and output-side engage/disengage changeover means;

said input-side engage/disengage changeover means operating changeover of engagement/disengagement between any one element of the planetary gear set and the input member; and said output-side engage/disengage changeover means establishing first and second changeover states in which both or either one of two elements except one element engaged with the input member is engaged with either one of the output members, and a third changeover state in which another element except said one element engaged with the input member is engaged with the two output members and the remaining one element is engaged with the reaction member.

Further, the above engage/disengage changeover means can establish a neutral state.

SUMMARY OF THE PREFERRED EMBODIMENTS

The above engage/disengage changeover means may include a splined sleeve (a kind of dog-clutch), for instance.

The changeover operation of the engagements/disengagement depends upon the structure of the sleeve and the relative positional relationship between engagement elements. For instance, it is possible to engage the sleeve with any required engagement elements by slidably moving the sleeve in the axial direction.

The sleeve disposed on the input side (input-side sleeve) is so arranged as to engage with the input member at all times but selectively engageable with either one of a sun gear and a carrier of a planetary gear set.

The output-side sleeve may be made up of a plurality of sleeves, formed integrally or separately. In a case where a ring gear of the planetary gear set is fixed or engaged for output train according to a given slide operation of the sleeve, a sleeve 1 is so constructed as to be engaged with a ring gear at all times and further selectively engaged with any one of the reaction member (e.g. a case) and the output member (e.g. an output shaft). A sleeve 2 is engageable with any one of the gear elements and further with one or two of the output members.

By way of example, where the input-side sleeve is engaged with the carrier, the output-side sleeve is constructed in such a way that the sleeve 1, always engaged with a ring gear, is engaged with one output member, and the sleeve 2 causes the sun gear to engage with another output member (a first changeover state).

Or else, it is also possible to limit the engagement with the output member to either one of the ring gear or the sun gear by modifying the sleeve construction (a third changeover state).

When the input-side sleeve is engaged with the sun gear, the sleeve 1 is engaged with the reaction member, and the sleeve 2 causes the carrier C to engage with two output members in a direct-coupling mode (a second changeover state).

Since the sleeves are provided on the input and output sides and the engagement is changed-over by these two sleeves, it is possible to change-over the engagement on both the sides simultaneously and to minimize the changeover mechanism.

The transfer apparatus of the present invention is provided with two functions, i.e., all-wheel (or 4WD) direct-coupled drive and front-and-rear wheel differential drive, those being realized by means of a series of gears, being small in dimensions and light in weight, and simple in direct-coupled and differential changeover operation. Further, since the number of gears is reduced and the mechanism is simplified, it is possible to reduce gear noise. Furthermore, speed change gear operation (High/Low) can be enabled simultaneously. Further preferred embodiments are set forth in the In the following the invention will be described in more detail with reference to the Drawings illustrating the preferred embodiments.

DETAILED DESCRIPTION OF THE PREFERRED EMBODIMENTS

A planetary gear set includes a set of three gears (sun gear, planetary pinion gear and ring gear) and a carrier to support the planetary pinion gear. Any required power train can be obtained by engaging any one element of the sun gear, carrier and ring gear with an input member; another (second) element with an output member; and by engaging the third element with one of the other two remaining elements or with the other output member, or by fixing the third element.

Now, if one element is fixed, power is inputtable to any one of the two remaining elements, and the remaining element becomes an output element. In this case, when the output element is engaged with the two output members, a direct-coupled (all-wheel) drive power train can be attained. Further, the differential power train can be attained when any one (e.g. carrier) of these elements is engaged with the input member and the two other elements are engaged with the two output members, independently of each other.

In FIGS. 4A through 4G, S denotes a sun gear; C denotes a carrier; and R denotes a ring gear.

In the case of direct-coupled four-wheel drive, the following two modes can be selected, if S is engaged with an input.

Figure 4:
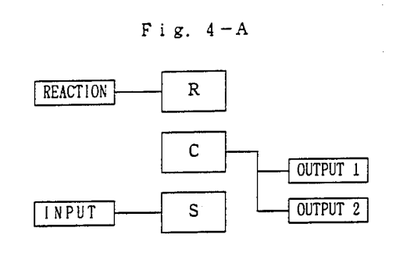
FIGS. 4A through 4G are a number of block diagrams for assistance in explaining the operations of direct-coupled all-wheel driving and differential all-wheel driving.

(A) R is engaged with a reaction member; C is engaged with output 1 and output 2 (FIG. 4-A).

(B) C is engaged with a reaction member; R is engaged with output 1 and output 2 (FIG. 4-B).

Further, the following two modes can be selected if C is engaged with an input.

(C) S is engaged with a reaction member; R is engaged with output 1 and output 2 (FIG. 4-C).

(D) R is engaged with a reaction member; S is engaged with output 1 and output 2 (FIG. 4-D).

Where R is engaged with an input, two selections can be obtained similarly. (Description thereof being omitted herein).

In the case of differential four-wheel drive, two elements out of S, C and R are engaged with two outputs, independently of each other as follows:

(E) if C is engaged with an input, R is engaged with output 1 and S is engaged with output 2, respectively (FIG. 4-E) (or converse).

(F) if S is engaged with an input, R is engaged with output 1 and C is engaged with output 2, respectively (FIG. 4-F) (or converse).

(G) if R is engaged with an input, C is engaged with output 1 and S is engaged with output 2, respectively (FIG. 4-G) (or converse).

Further, when only one output 1 or 2 is engaged with the carrier C in the direct-coupled four-wheel drive mode shown in FIG. 4-A, for instance, a two-wheel drive can be attained. By switching the engagement, it is possible to obtain two-wheel/direct-coupled four-wheel drive, and further two-wheel/differential four-wheel drive based on differential four-wheel drive as shown in FIGS. 4(E) to (G).

As described above, in the transfer apparatus according to the present invention, various engagements can be combined. However, when a transfer apparatus is incorporated in a vehicle, it is preferred to use the transfer apparatus in a speed reduction mode from a viewpoint of efficiency.

Figure 2:
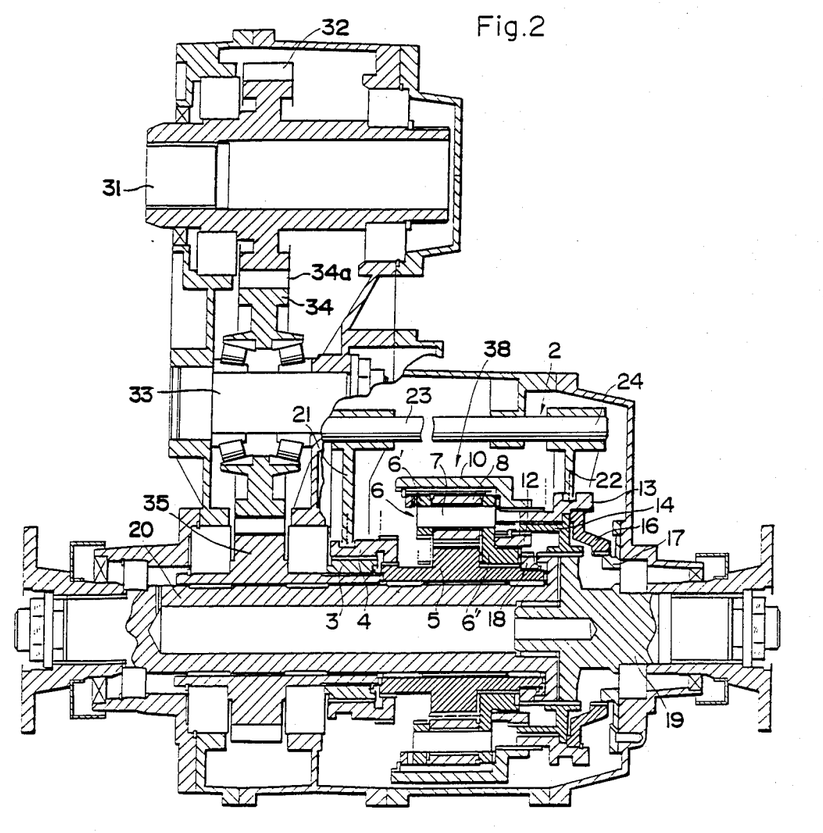
FIG. 2 is an entire cross-sectional view of the transfer apparatus.

An embodiment of the present invention will be described hereinbelow with reference to the attached drawings. FIG. 2 shows an overall view of an embodiment of the transfer apparatus according to the present invention, in which a direct-coupled power train shwon in FIG. 4-A and a differential power train shown in FIG. 4-E are combined as represented by a skeleton diagram shown in FIG. 3. In fig. 2, numeral 31 denotes an input shaft connected to an output shaft of a transmission. An input-side gear train is made up of gears 32, 34 and 35. The numeral 32 denotes an input gear formed integral with the input shaft 31. The numeral 34 denotes an idler gear formed integral with an idler gear 34a meshing with the input gear 32. This idler gear 34 is rotatably supported by an idler shaft 33 via a bearing. The numeral 35 denotes an output gear of the input-side gear train, which meshes with the idler gear 34a and rotatably supported by a front output shaft 20.

Figure 1:
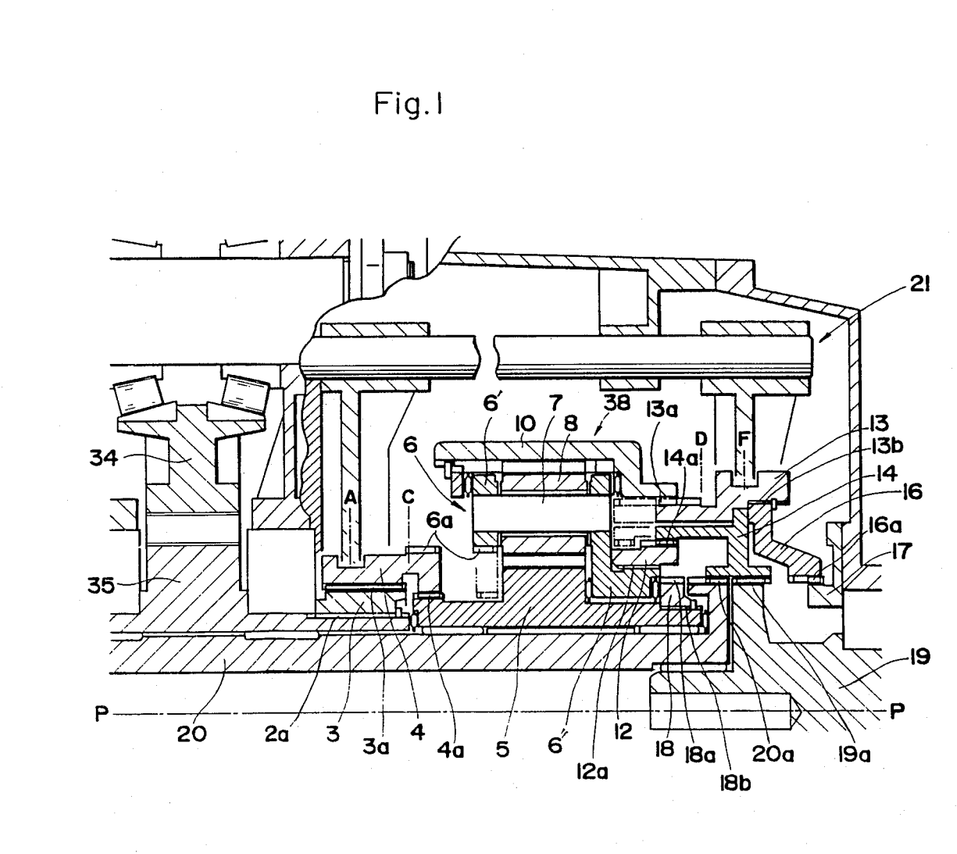
FIG. 1 is an enlarged cross-sectional view showing an embodiment of the transfer apparatus of the present invention.

FIG. 1 is an enlarged view showing the transfer apparatus of the present invention. In the above embodiment, a splined sleeve (a kind of dog clutch) of the axially slidable type is used as an engage/disengage changeover means. However, without being limited thereto, it is possible to use clutches of other types or rotary engage/disengage means. A hub 3 is coupled with an output gear 35 via a spline 2a. An input sleeve 4 is always in engagement with the hub 3 via a spline 3a slidable in the axial P-P direction thereof.

Numeral 38 denotes a planetary gear set. A sun gear 5 is rotatably supported by a front output shaft 20. A planetary gear 8 in mesh with the sun gear 5 is rotatably mounted on a planetary gear shaft 7 fixed to a planetary carrier 6. The planetary gear 8 is in mesh with a ring gear 10.

An input sleeve 4 is selectively engageable with the carrier 6 and the sun gear 5. The input sleeve 4 is engaged with or disengaged from the sun gear 5 via a spline 4a, when the sleeve 4 is slided in an axial direction thereof. In the same way, an input-side member 6' of the planetary carrier 6 is disengageably engaged with the sleeve 4 via a spline 6a.

The output-side engagement and disengagement can be attained by an outer sleeve 13 and an inner sleeve 14 arranged in axially fixed but radially in a rotatable relationship to each other.

A ring gear 10 is disposed engageable/disengageable with the outer sleeve 13 which is slidable in the axial P-P direction via a spline 13a. The outer sleeve 13 is coupled integral with a case engagement sleeve 16 via a spline 13b. The sleeve 16 is selectively engaged with or disengaged from the case 17 or a rear output shaft 19 via a spline 16a. The inner sleeve 14 is positioned by the outer sleeve 13 in the axial P-P direction but rotatable relative to the outer sleeve 13. The inner sleeve 14 is engageable with or disengageable from a hub 12 via a spline 14a, a hub 18 via a spline 18a, and a rear output shaft 19 via a spline 19a, and further engaged with a front output shaft 20 slidably relative thereto via a spline 20a.

A hub 12 is coupled with an output-side member 6" of the planetary carrier 6 via a spline 12a, and a hub 18 is coupled with the sun gear 5 via a spline 18b.

Figure 5:
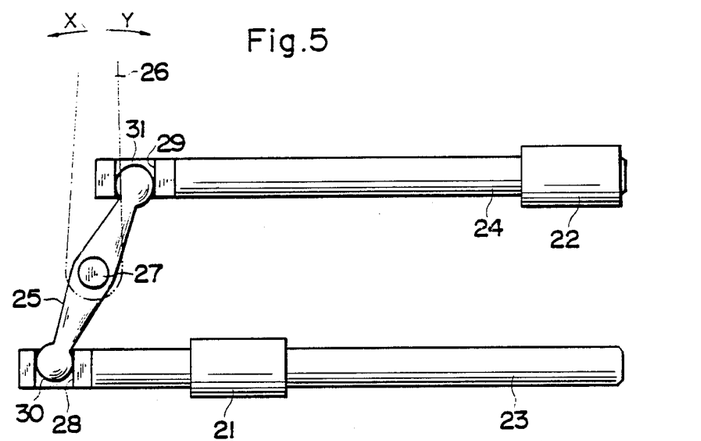
FIG. 5 is a plan view showing an engage/disengage changeover operation means of the present invention.
Figure 6:
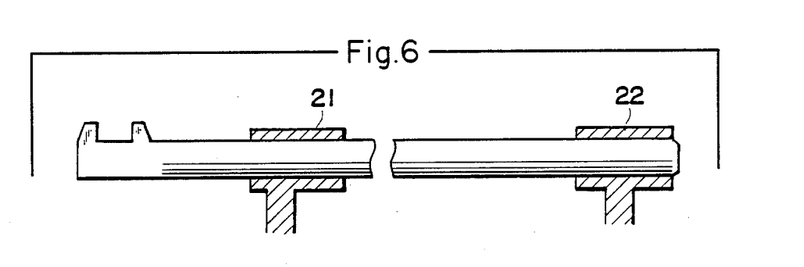
FIG. 6 is a longitudinal cross-sectional view of the operation means shown in FIG. 5.

FIG. 5 is a plan view showing an embodiment of an engage/disengage changeover operating means, and FIG. 6 is a longitudinal cross-sectional view thereof.

In FIG. 5, numeral 26 denotes an outer lever (operation lever); numeral 25 denotes an inner lever (or rotatable lever). Both the levers are concentrically connected to each other so as to be rotatable with an axle 27 about the center of the inner lever.

Two fork shafts 23 and 24 are supported by fork shaft support members 11 and 15 formed in the case 17. A groove 28 or 29 is formed at one end of each fork shaft 23 or 24 so as to extend normal to the axial direction thereof. Tow circular end portions 30 and 31 of an inner lever 25 are rotatably and slidably fitted in the grooves 28 and 29, respectively. Two fork members 21 and 22 are fixed to the fork shafts 23 and 24, respectively. In FIG. 1, annular grooves 1 and 2 are formed at the outer circumference of the input sleeve 4 and the outer sleeve 13, respectively. The fork member 21 fixed to the fork shaft 23 is fitted to the groove 1; the fork member 22 fixed to the fork shaft 24 is fitted to the groove 2.

Figure 3:
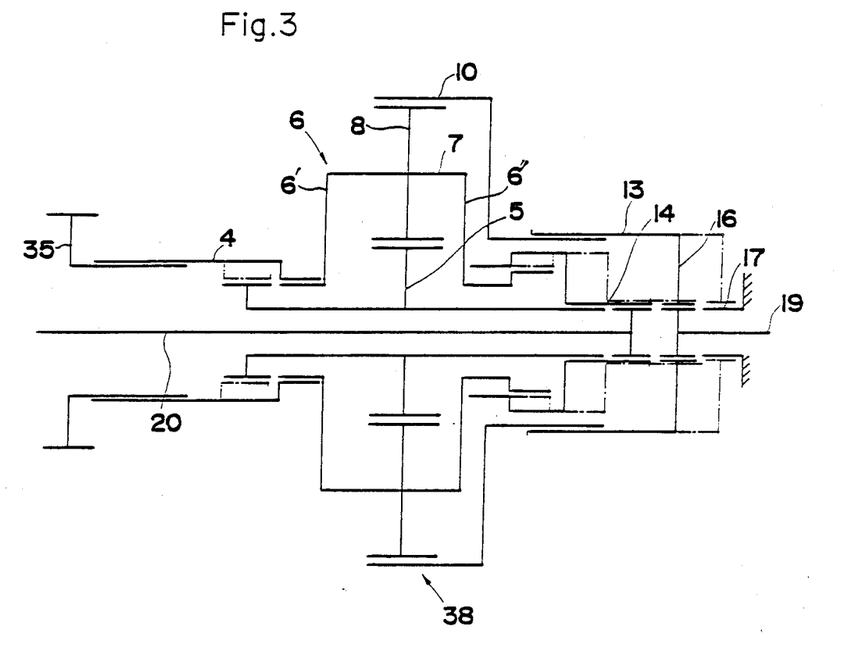
FIG. 3 is an illustration showing power transmission.

In FIG. 3, when a drive power (torque) inputted from a transmission unit (not shown), is inputted to the carrier 6 via the sleeve 4, the power is distributed to the ring gear 10 and the sun gear 5 via the pinion gear 8 rotatably supported by the carrier 6 via the planetary gear axle 7. A drive power distributed to the ring gear 10 is transmitted to the rear output shaft 19 through an engagement of the sleeves 13 and 16. A drive power distributed to the sun gear 5 is transmitted to a front output shaft 20 via the sleeve 14 engaged with the sun gear. In summary, the distributed drive powers are selectively transmitted to each output shaft via the engage/disengage changeover means (a set of sleeves) selectively engageable with the ring gear 10, the sun gear 5 or the carrier 6.

A drive power inputted from the transmission unit to the carrier 6 as described above is distributed to the rear output shaft and the front output shaft. In this operation, the planetary gear set functions as a central differential gear.

Thereafter, when the engagement is changed-over to a position as shown by dot-dashed lines in FIG. 3, a drive power from the transmission unit is inputted to the sun gear 5 via the sleeve 4, then transmitted to the pinion gear 8. In this operation, the ring gear 10 is engaged with the transfer case 17 via the sleeves 13 and 16, and thereby not rotatable. A power transmitted to the pinion gear 8 is transmitted to the carrier 6 (the output-side member 6") and therefore amplified in torque (the rotational speed is reduced). The drive power transmitted to the carrier 6 is transmitted to both the front output shaft 20 and the rear output shaft 19 engaged with each other via the sleeve 14. In this operation, the planetary gear set functions as a speed reduction device, and the front output shaft and the rear output shaft are coupled together, without producing a differential output between the two output shafts.

The operation of the transfer gear according to the preferred embodiment invention will be described hereinbelow. FIG. 1 illustrates a low-speed high-power drive travelling state.

An input power from a transmission (not shown) is transmitted to the output gear 35 via the idler gear 34, and then transmitted to the hub 3 coupled to the output gear 35 by the spline 2a. The input power transmitted to the hub 3 is transmitted to the planetary gear 8 from the sun gear 5 via the sleeve 4. The case engagement sleeve 16 is not rotatable because now this is engaged with the case 17. The outer sleeve 13 and the ring gear 10 are both not rotatable. Therefore, an input transmitted to the planetary gear 8 rotates the planetary carrier 6 about the axis (P—P) to increase torque (the speed is reduced). The input power whose torque has been amplified is transmitted to the inner sleeve 14 via the hub 12, and further from the inner sleeve 14 to the rear output shaft 19 and the front output shaft 20. In the operation, the input power is amplified (increased in torque) in the planetary gear set 38, and the input rotational speed of the output gear 35 is reduced to be transmitted to the output shafts 19 and 20, thus realizing a low-speed vehicle travelling mode.

The operation where the planetary gear set functions as a central differential gear will be described hereinbelow.

In FIG. 5, when the outer lever 26 is rotated in the X-direction, the inner lever 25 rotates counterclockwise in the same direction as the outer lever. At this moment, the fork shaft 24 shifts leftward, while the fork shaft 23 shifts rightward, respectively. Therefore, the fork member 21 fixed to the fork shaft is moved rightward, so that the groove 1 of the input sleeve 4 is slided to a position C shown in FIG. 1. Similarly, the fork member 22 is moved leftward, so that the groove 2 of the outer sleeve 13 is slided to a position D.

In the same way as described above, the input power from the transmission unit is transmitted to the hub 3 via the idler gear 34 and the output gear 35. The input power transmitted to the hub 3 is further transmitted to the planetary carrier 6 via the input sleeve 4. The input power is transmitted from the carrier 6 to the planetary gear 8 via the planetary gear axle 7 and then distributed to the ring gear 10 and the sun gear 5. An input power distributed to the sun gear 5 is transmitted to the front output shaft 20 via the hub 18 and the inner sleeve 14. An input power distributed to the ring gear 10 is transmitted to the case engagement sleeve 16 via the outer sleeve 13. Since the sleeve 16 is now engaged with the rear output shaft 19, the distributed input power is transmitted to the rear output shaft 19. In these operations, the planetary gear set 38 functions as a central differential gear. Further, the planetary gear set is provided with a speed change gear function together such that a higher-speed low-power drive mode can be attained. It should be understood that modifications from the embodiment may be done without herein from the gist and scope of the present invention herein disclosed and claimed hereinbelow.

What is claimed is:

1. A direct-coupling/differential changeover transfer apparatus provided with speed change gear function, which comprises an input member; two output members; a reaction member; a planetary gear set; and engage/disengage changeover means for effecting engagement/disengagement between elements of the planetary gear set and said members and between two of said elements of the planetary gear set;

said engage/disengage changeover means establishing a direct-coupled power train between all input and output members by engaging one of the elements of the planetary gear set with the reaction member and by engaging one of the two other elements with the input member and the remaining one thereof with two output members, and further establishing a differential power train between the input member and the two output members in a differential relationship between the two output members by engaging one of the elements of the planetary gear set with the input member and by engaging each of the other two elements with one of the two output members, respectively.

2. The transfer apparatus as set forth in claim 1, wherein different speed change ratios of the input member to the output members can be established between the differential power train and the direct-coupled power train.

3. The changeover transfer apparatus as set forth in claim 1, wherein said planetary gear set includes a sun gear, carrier supporting a pinion gear, and a ring gear;
   said input member is selectively engageable/disengageable with the sun gear or the carrier;
   said sun gear is selectively engageable/disengageable with one of the output members;
   said carrier is selectively engageable/disengageable with both the output members, and simultaneously disengageable/engageable with one of the output members; and
   said ring gear is selectively engageable/disengageable with a casing or the other output member.

4. The changeover transfer apparatus as set forth in claim 3, wherein said changeover means includes coupling means on the input and output sides of the planetary gear set.

5. The changeover transfer apparatus as set forth in claim 4, wherein said coupling means include axially slidable coupling members.

6. The changeover transfer apparatus as set forth in claim 5, wherein said coupling members includes:
   an input side coupling member for selectively engaging/disengaging the input member with the sun gear or carrier of the planetary gear set;
   a first output side coupling member for selectively changeing-over between a coupling state between the sun gear and one of the output members and another coupling state between the carrier and both the output members; and
   a second output side coupling member for selectively engaging/disengaging the ring gear with the other output member or a casing as the reaction member.

7. The changeover transfer apparatus as set forth in claim 6, wherein said first and second output side coupling members are disposed simultaneously slidably in the same direction.

8. The changeover transfer apparatus as set forth in claim 7, wherein said first and second output side coupling members are axially associated each other but radially rotatable relative to each other.

9. The changeover transfer apparatus as set forth in claim 6, wherein at least any one of said input side and output side coupling members have a neutral position which is at a disengaged state.

10. The changeover transfer apparatus as set forth in claim 9, wherein the input side coupling member has a neutral position.

11. The changeover transfer apparatus as set forth in claim 9, wherein the second output side coupling member has a neutral position.

12. The changeover transfer apparatus as set forth in claim 5, wherein said axially slidable coupling members include sleeves with meshing means.

13. The changeover transfer apparatus as set forth in claim 12, wherein the meshing means are splines.

14. The changeover transfer apparatus as set forth in claim 8, wherein said coupling members are shifted by an operating lever.

15. The changeover transfer apparatus as set forth in claim 14, wherein said operating lever is operatively connected to the coupling members via a pair of fork shafts.

16. The changeover transfer apparatus as set forth in claim 15, wherein said pair of fork shafts are actuated in an opposing direction to each other to selectively establish any one of said power trains.

17. An engage/disengage changeover operation means for a transfer apparatus provided with speed change gear function, and comprising an input member; two output members; a reaction member; a planetary gear set; and engage/disengage changeover means for effecting engagement/disengagement between elements of the planetary gear set and said members and between two out of said elements, said changeover operation means further comprising:
a pair of fork shafts each provided with a fork member and an operation lever operatively connected to the fork shafts;
movement of said operation lever being converted into movements of the fork shafts to shift the engage/disengage changeover means; on an input side, said movement of one of the fork shafts causing the input member to selectively engage with one of the elements of the planetary gear set; and on an output side, said movement of the other of the fork shafts establishing a first changeover state in which ends of two of said elements except said one element engaged with the input member is engaged with each one of the output members and a second changeover state in which another element except said element engaged with the input member is engaged with two output members and the remaining element is engaged with the reaction member.

18. The changeover operation means as set forth in claim 17, wherein said movements of the fork shafts are axial movements thereof for shifting said engage/disengage changeover means in a direction parallel with an axial direction of said output members.

19. The changeover operation means as set forth in claim 18, wherein said engage/disengage changeover means comprises at least two axially slidable coupling means, one on the input side and the other on the output side of the planetary gear set, for engagement/disengagement.

20. The changeover operation means as set forth in claim 19, wherein said axially slidable coupling means include a pair of sleeves.

21. The changeover operation means as set forth in claim 20, wherein said sleeves are provided with meshing means for engagement/disengagement for establishing said changeover states.

22. The changeover operation means as set forth in claim 21, wherein said meshing means includes splines.

23. The changeover operation means as set forth in claim 17, wherein said operation lever is operatively connected to the pair of fork shafts so as to cause the fork shafts to actuate in an opposing direction to each other.

24. The changeover operation means as set forth in claim 23, wherein said operation lever is operatively connected via an inner lever associated with said fork shafts.

25. The changeover operation means as set forth in claim 24, wherein said inner lever is rotatable about an axle disposed at the center of the inner lever.

26. The changeover operation means as set forth in claim 25, wherein said inner lever is with both ends thereof linked with said fork shafts.

27. The changeover operation means as set forth in claim 17, wherein said fork shafts are provided with a fork member associated with the engage/disengage changeover means on the input and output sides, respectively.

28. A transfer apparatus having an input member two output members; a reaction member a planetary gear set; and input-side and output-side engage/disengage changeover means;
said input-side engage/disengage changeover means operating changeover of engagement/disengagement between one element of the planetary gear set and the input member; and
said output-side engage/disengage changeover means establishing first and second changeover states in which at least one of two elements except one element engaged with the input member is engaged with either one of the output members, and a third changeover state in which another element except said one element engaged with the input member is engaged with the two output members and the remaining one element is engaged with the reaction member.

29. The transfer apparatus as set forth in claim 28, wherein said engage/disengage changeover means includes a neutral state.

30. The transfer apparatus as set forth in claim 28, wherein the planetary gear set includes three elements consisting of a sun gear, a carrier supporting a pinion gear, and a ring gear.

31. The transfer apparatus as set forth in claim 30, wherein said input-side changeover means is changed-over between a first position engaging the input member with the sun gear, and a second position engaging the input member with the carrier; and
said output-side change-over means is changed-over between a first position engaging the carrier with the two output members and a second position where the sun gear is engaged with one of the output members and the ring gear is engaged with the other output member, whereby changeover in an all-wheel drive between a direct-coupled drive mode and a differential coupled drive mode is established.

32. The transfer apparatus as set forth in claim 30, wherein said input-side changeover means is changedover between a first position engaging the input member with the sun gear, and a second position engaging the input member with the carrier; and
said output-side change-over means is changed-over among three positions;
a first position engaging the carrier with the two output members, a second position engaging the sun gear with one of the output members and engaging the ring gear with the other and a third position engaging the carrier and the ring gear with one of the output members, respectively.

33. The transfer apparatus as set forth in claim 28, wherein said input-side changeover means includes a neutral position.

34. The transfer apparatus as set forth in claim 28, wherein said output-side changeover means includes a neutral position.

35. The transfer apparatus as set forth in claim 30, wherein said input member is engageable with the sun gear, the ring gear is engageable with the reaction member, and the carrier is engageable with the two output members.

36. The transfer apparatus as set forth in claim 30, wherein said input member is engageable with the carrier, each of the two output members are engageable with one of the remaining elements, respectively.

37. The transfer apparatus as set forth in claim 30, wherein said input member is engageable with the sun gear, and each of the remaining two elements are engageable with one of the output members, respectively.

38. The transfer apparatus as set forth in claim 30, wherein said input member is engageable with the sun gear, and one of the two remaining elements is engageable with both the output members.

* * * * *